(12) United States Patent
Nakazawa

(10) Patent No.: US 6,580,247 B2
(45) Date of Patent: Jun. 17, 2003

(54) MOTOR CONTROL DEVICE

(75) Inventor: Yosuke Nakazawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/097,433

(22) Filed: Mar. 15, 2002

(65) Prior Publication Data
US 2002/0171389 A1 Nov. 21, 2002

(30) Foreign Application Priority Data
Mar. 16, 2001 (JP) ........................................ 2001-077039

(51) Int. Cl.[7] ................................................. H02P 1/46
(52) U.S. Cl. ...................... 318/700; 318/701; 318/254; 318/599; 318/434; 318/721
(58) Field of Search ................... 318/700, 254, 318/716–724, 701, 138, 439, 434, 599

(56) References Cited

U.S. PATENT DOCUMENTS 5,854,547 A    12/1998   Nakazawa
5,920,161 A  * 7/1999   Obara et al. ............... 318/139
5,963,007 A  * 10/1999  Toyozawa et al. .......... 318/799
6,081,093 A  * 6/2000   Oguro et al. ............... 318/807
6,274,960 B1   8/2001   Sakai et al.
6,281,656 B1 * 8/2001   Masaki et al. ............. 318/700
6,339,308 B2 * 1/2002   Shinnaka .................... 318/701
6,344,725 B2 * 2/2002   Kaitani et al. ............. 318/700
2001/0019251 A1 9/2001  Nakazawa

* cited by examiner

Primary Examiner—Bentsu Ro
Assistant Examiner—Rina I. Duda
(74) Attorney, Agent, or Firm—Foley & Lardner

(57) ABSTRACT

A pulse synchronized with the period of PWM of inverter and depending on the inferred value of the position of the motor rotor is applied as a PWM pattern to the motor and as a result the difference of magnetic resistance of the motor rotor, which can be inferred by observing the rate of change with time of the d axis current and q axis current on the d and q axis co-ordinates of the current flowing through the motor winding is detected and the position of the motor rotor can be thereby inferred. Thus the position of the motor rotor can be ascertained with high precision by a straightforward device construction without employing a rotor position sensor and reduction in size, reduction in costs and facilitation of maintenance can be achieved.

8 Claims, 10 Drawing Sheets

MOTOR CONTROL DEVICE

CROSS REFERENCE TO RELATED APPLICATION

This application claims benefit of priority to Japanese application number JP 2001-77039 filed Mar. 16, 2001, the entire content of which is incorporated by reference herein.

BACKGROUND OF THE INVENTION

1. Field of the Invention

The present invention relates to a motor control device which is reduced in size, is of lower cost, and wherein maintenance is facilitated.

2. Description of the Related Art

Conventionally, the following two systems are employed for the control devices of, for example, permanent magnet synchronous motors. Specifically:

(1) system wherein the position of the rotating magnetic field is detected and control of the driving inverter is performed in accordance therewith; and (2) system wherein the output frequency of the inverter is controlled by an open loop, irrespective of the position of the magnetic field.

The former is sometimes called a brushless DC motor, since similar operation and characteristics are obtained to those of a DC motor.

The latter has similar control characteristics to the voltage/frequency control (V/f) of an induction motor, but in the case where a forced cooling system thereof is employed loss of synchronization can occur.

Consequently, owing to the difficulty of obtaining large torque at low rotational speed, this system is only employed in special applications, such as winders of fiber machinery.

FIG. 1 is a block diagram illustrating the basic control layout of a permanent magnet synchronous motor of this type.

As shown in FIG. 1, a permanent magnet synchronous motor comprises a permanent magnet synchronous motor body 1, a voltage source PWM inverter (hereinbelow simply called an inverter) 2 for converting DC power to AC power and supplying it to permanent magnet synchronous motor 1, pole position detector 3 for determining the phase of the applied voltage or current of permanent magnet synchronous motor 1 and current controller 4.

In order to perform speed control, there are further added thereto a speed controller 5 for this purpose and a rotary speed detector 3.

Further, when position control is to be performed, a position controller 6 and position detector 3 are added.

Recently, in addition, as a control device for a permanent magnet synchronous motor of this type, a system has been proposed in which control is performed using vector control.

FIG. 2 is a functional block diagram illustrating an example layout of a control device for a prior art permanent magnet synchronous motor using such vector control, elements which are the same as elements in FIG. 1 being given the same reference symbols.

In FIG. 2, current control means (unit) 7 inputs d axis current instruction and q axis current instruction IdRef, IqRef and the actual values Id, Iq of the d axis current and q axis current that are output from current co-ordinate conversion means (unit) 9, finds by calculation the d axis voltage instruction and q axis voltage instruction VdRef and VqRef and outputs these.

Voltage instruction co-ordinate conversion means (unit) 8 inputs the d axis voltage instruction and q axis voltage instruction VdRef and VqRef that are output from current control means (unit) 7 and the position detection value 6 of the motor rotor that is output from rotor position sensor 10, and finds by calculation and outputs the three-phase voltage instructions Vu, Vv and Vw of inverter 2.

It should be noted that, although the symbols such as for example Vu, Vv and Vw and other symbols indicated in FIG. 2 should properly be represented as vector quantities, for convenience, they are represented as scalar quantities.

Current co-ordinate conversion means (unit) 9 inputs the two phase current detection values Iu, Iw of the three phases and rotor position detection value θ that is output from rotor position sensor 10, and finds by calculation and outputs the actual values Id, Iq of the d axis current and q axis current, which are their values on the d and q co-ordinate axes.

However, in cases where the motor output torque of for example a permanent magnet motor or reluctance motor is to be controlled with high precision and high speed by a control device using vector control as described above, a rotor position sensor 10 must be mounted in order to enable inflow of current in accordance with the position of the motor rotor.

However, rotor position sensor 10 was of comparatively large volume, which made the device bulky and tended to restrict possibilities regarding its installation; furthermore, possible causes of faults such as the difficulty of leading out a control lead for transmitting output from the rotor position sensor 10 to the main unit of the control device and also disconnection etc were increased, raising costs and making maintenance more difficult.

In a permanent magnet motor, it is possible to ascertain the position of the motor rotor indirectly by detecting the motor back e.m.f. (electromotive force (BEMF) or counter electromotive force (CEMF)) caused by the magnetic flux of the permanent magnet during rotation, but in operating conditions of zero rotational speed, in which in principle no back e.m.f. is generated, there is the problem that it is not possible to thereby ascertain the position of the motor rotor.

SUMMARY OF THE INVENTION

An object of the present invention is to provide a motor control device wherein the position of the motor rotor can be ascertained with high precision by a straightforward device construction without employing a rotor position sensor and reduction in size, reduction in costs and facilitation of maintenance can be achieved.

In order to achieve the above object, the present invention is constructed as follows. Specifically, a motor control device comprising:

a motor rotor having magnetically protruding polarity;

an inverter that converts DC power to AC power; and a control unit that supplies the output from this inverter to the motor rotor, further comprises:

a PWM pattern generating means (unit) that calculates and outputs a PWM pattern such as to output a pulse synchronized with the period of pulse width modulation (PWM) of the inverter and depending on the inferred position value of the motor rotor;

a current co-ordinate conversion means (unit) that, using the inferred position value of the motor rotor converts the three-phase current of the motor to actual values of the d axis current and q axis current, which are values on the d and q co-ordinate axes, wherein q axis is direction of the protruding polarity of the motor rotor, and d axis is direction at right angles to the direction of protruding polarity of the motor rotor;

a d and q axis rate of current change calculating means (unit) that respectively calculate and output the rates of change with time of the d axis current and q axis current actual values, which are the outputs from the current co-ordinate conversion means (unit), synchronized with the PWM pattern which is the output from the PWM pattern generating means (unit); and a motor rotor position inferring means (unit) that infers and calculates the position of the motor rotor, using the PWM pattern which is output from the PWM pattern generating means (unit) and the d axis rate of current change and q axis rate of current change which are output from the d and q axis rate of current change calculating means (unit) and outputs this as the inferred position value of the motor rotor.

Consequently, in a motor control device according to the present invention, thanks to the provision of means as described above, a pulse synchronized with the period of pulse width modulation (PWM) of the inverter and depending on the inferred value of the position of the motor rotor is applied as a PWM pattern to the motor and as a result the difference of magnetic resistance of the motor rotor, which can be inferred by observing the rate of change with time of the d axis current and q axis current on the d and q axis co-ordinates of the current flowing through the motor winding is detected and the position of the motor rotor can be thereby inferred without using a rotor position sensor.

In particular, since a pulse synchronized with the PWM pattern is applied and the rate of change of current of the d axis current and q axis are detected synchronously with the PWM pattern, error in inferring the motor rotor position caused by current harmonics in PWM switching can be reduced.

In this way, the position of the motor rotor can be ascertained without employing a rotor position sensor; reduction in size, reduction in costs and increased ease of maintenance can thereby be achieved.

BRIEF DESCRIPTION OF THE DRAWINGS

A more complete appreciation of the present invention and many of the attendant advantages thereof will be ready obtained as the same becomes better understood by reference to the following detailed description when considered in connection with the accompanying drawings, wherein.

DETAILED DESCRIPTION OF THE PREFERRED EMBODIMENTS

Figure 1:
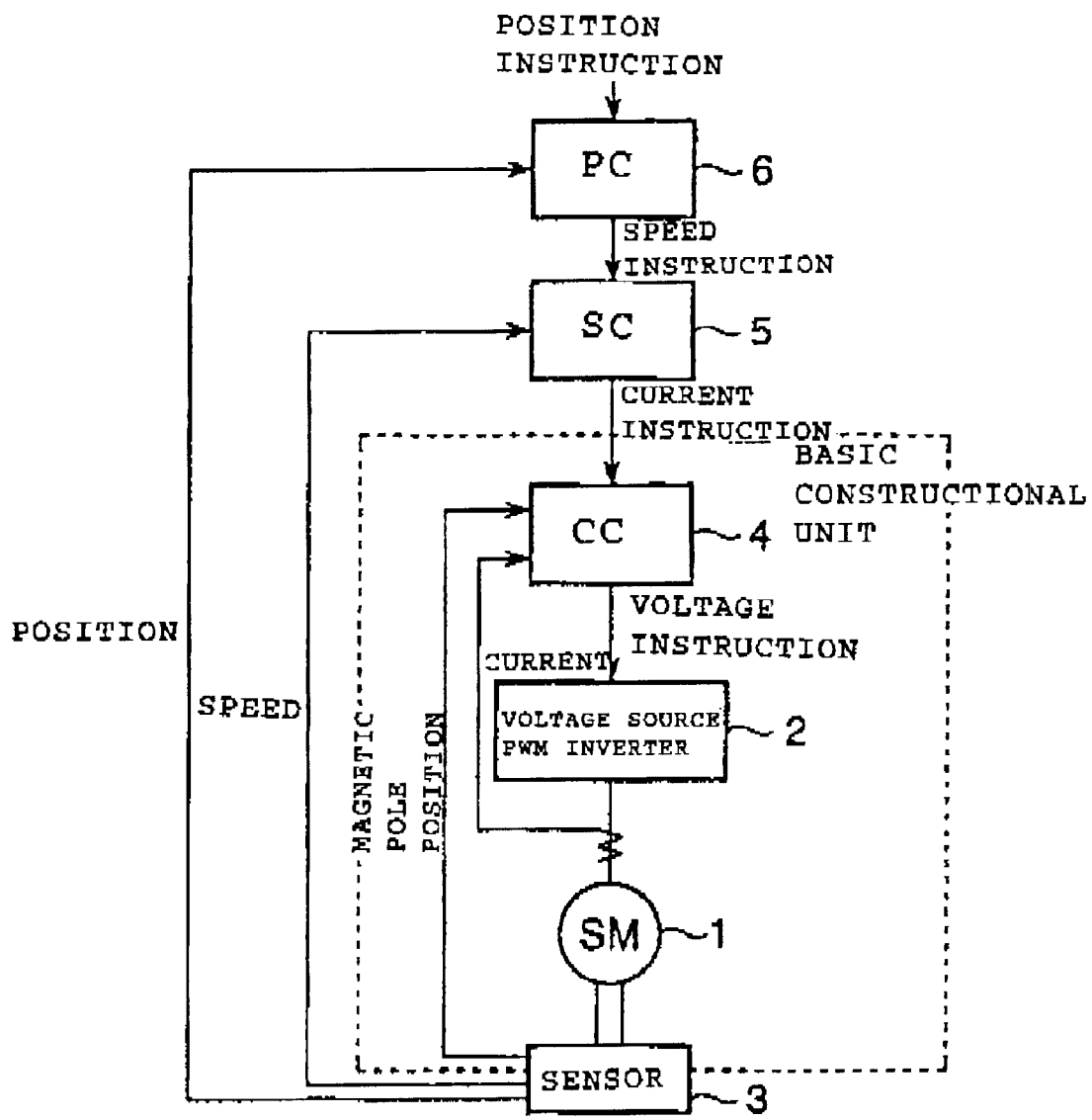
FIG. 1 is a block diagram illustrating the basic control layout of a permanent magnet synchronous motor.

Referring now to the drawings, wherein like reference numerals designate identical or corresponding parts throughout the several views, and more particularly to FIG. 3 thereof, one embodiment of present invention will be described.

According to the present invention, a pulse synchronized with the period of pulse width modulation (PWM) of the inverter and depending on the inferred value of the position of the motor rotor is applied as a PWM pattern to the motor and as a result the difference of magnetic resistance of the motor rotor, which can be inferred by observing the rate of change with time of the d axis current and q axis current on the d and q axis co-ordinates of the current flowing through the motor winding is detected and the position of the motor rotor is thereby inferred without using a rotor position sensor.

First Embodiment

Figure 2:
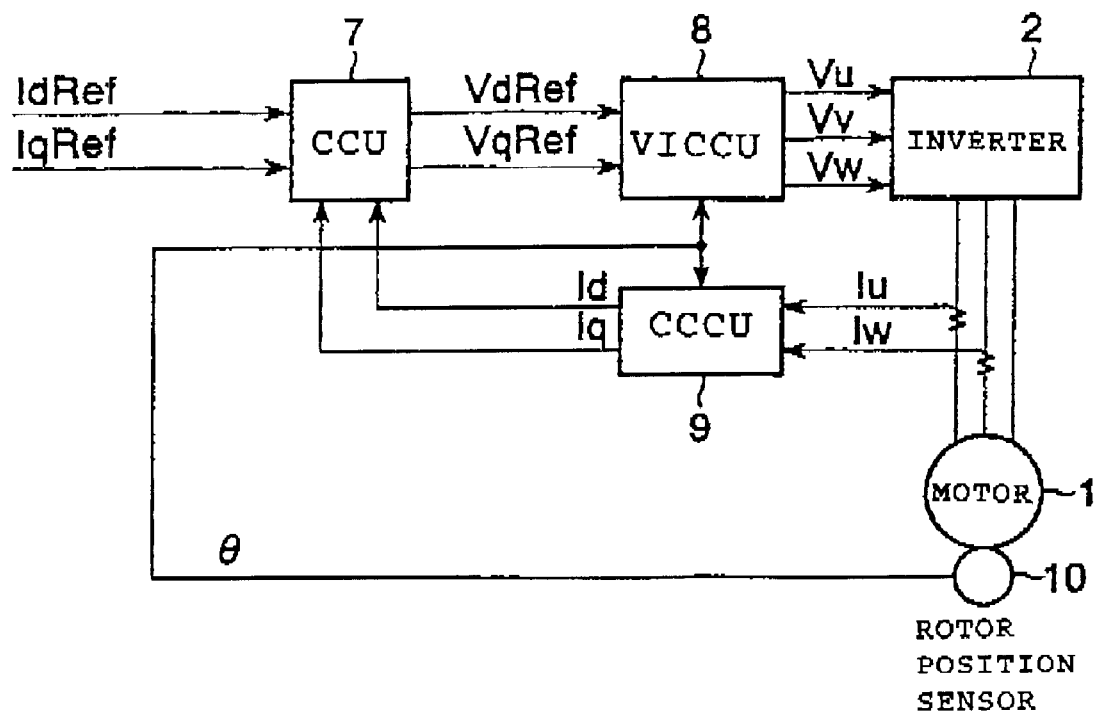
FIG. 2 is a functional block diagram illustrating the layout of a control device of a prior art permanent magnet synchronous motor using vector control.

An embodiment of the present invention based on the above concept will be described with reference to FIG. 3. FIG. 3 is a functional block diagram illustrating an example layout of a motor control device according to the present embodiment whereby the output from an inverter that converts DC power to AC power is supplied, the motor rotor having protruding magnetic polarity. Elements which are the same in FIG. 1 and FIG. 2 are given the same reference symbols and further description thereof is omitted, only parts which are different being described herein.

Figure 3:
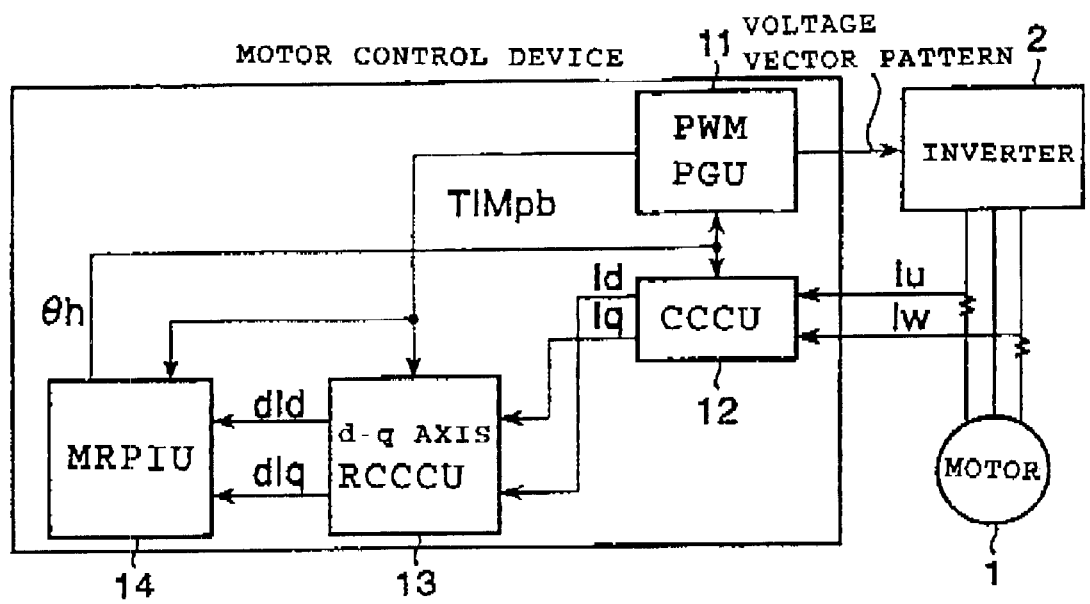
FIG. 3 is a functional block diagram illustrating a first embodiment of a motor control device according to the present invention.

Specifically, as shown in FIG. 3, a motor control device according to the present embodiment comprises PWM pattern generating means (unit) 11, current co-ordinate conversion means (unit) 12, d and q axis rate of current change calculation means (unit) 13, and motor rotor position inferring means (unit) 14.

PWM pulse generating means (unit) 11 calculates and outputs a PWM pattern such as to output a pulse synchronized with the pulse width modulation (PWM) period of inverter 2 mentioned above and in accordance with the inferred value of the position of the motor rotor, to be described.

Current co-ordinate conversion means (unit) 12, using the inferred position value of the motor rotor, to be described, converts the three-phase current of the motor to the actual values of the d axis current and q axis current, which are values on the d and q co-ordinate axes (q axis: direction of motor rotor protruding pole, d axis: direction at right angles to the direction of the motor rotor protruding pole) and outputs these.

The d and q axis rate of current change calculation means (unit) 13 respectively calculates the rates of change with time of the actual values of the d axis current and q axis current, which are the outputs from current co-ordinate conversion means (unit) 12, synchronized with the PWM pattern that is output from PWM pattern generating means (unit) 11, and outputs these.

The motor rotor position inferring means (unit) infers and calculates the motor rotor position, using the PWM pattern, which is output from PWM pattern generating means (unit) 11, and the d axis rate of current change and q axis rate of current change, which are output from the d and q axis rate of current change calculating means (unit) 13 and outputs this as the inferred position value of the motor rotor.

Next, the action of a motor control device according to the present embodiment constructed as described above will be described using FIG. 4 to FIG. 7.

In FIG. 3, the PWM pattern generating means (unit) 11 inputs the motor rotor inferred position value θh that is output from motor rotor position inferring means (unit) 14, and outputs a PWM pattern by performing the following calculation.

Figure 4:
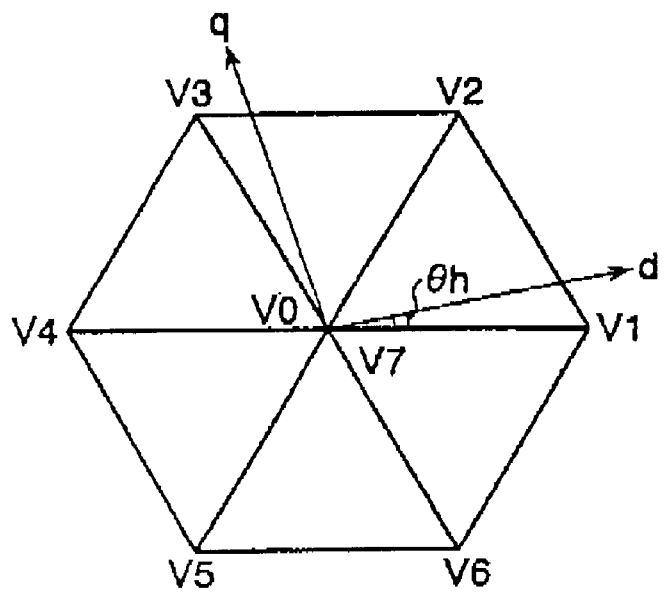
FIG. 4 is a view given in explanation of PWM voltage space vectors in PWM pattern generating means (unit) of a motor control device according to this first embodiment.

FIG. 4 is a diagram illustrating voltage space vectors in the PWM pattern generating means (unit) 11.

In FIG. 4, V0 to V7 respectively represent the switching conditions of the switching elements of the three-phase inverter 2 to shown in FIG. 5, and are defined as follows:

V0: U ON, V ON, W ON, X OFF, Y OFF, Z OFF
V1: U ON, V OFF, W OFF, X OFF, Y ON, Z ON
V2: U ON, V ON, W OFF, X OFF, Y OFF, Z ON
V3: U OFF, V ON, W OFF, X ON, Y OFF, Z ON
V4: U OFF, V ON, W ON, X ON, Y OFF, Z OFF
V5: U OFF, V OFF, W ON, X ON, Y ON, Z OFF
V6: U ON, V OFF, W ON, X OFF, Y ON, Z OFF
V7: U OFF, V OFF, W OFF, X ON, Y ON, Z ON.

Figure 6:
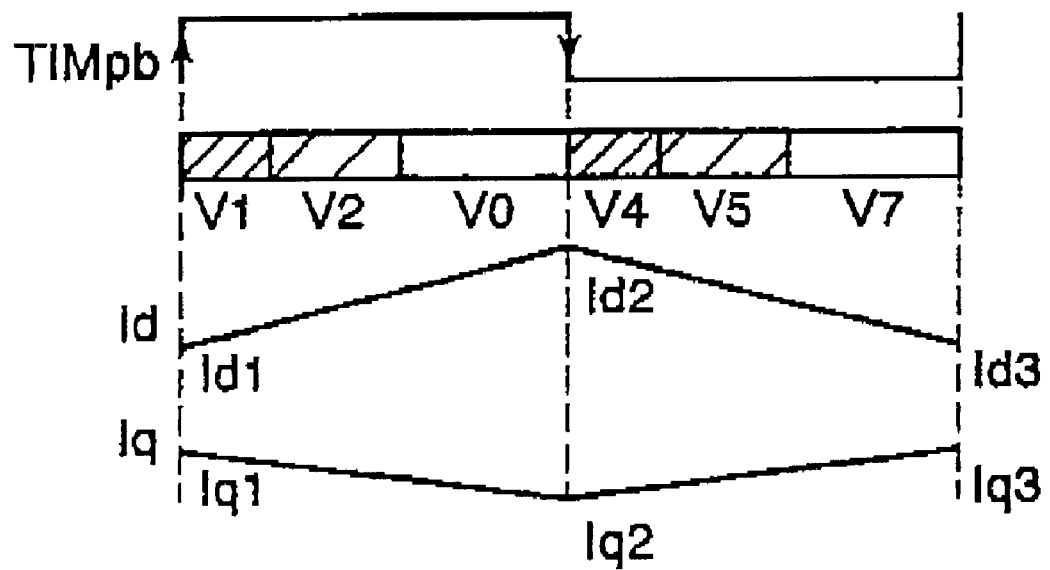
FIG. 6 is a timing chart of PWM pattern generating means (unit) in a motor control device according to this first embodiment.

During the PWM period T, the PWM synchronization pulse TIMpb that is switched between 1 and 0 with a time ratio of 1:1 is defined by the following expression, as shown in FIG. 6.

Regarding the time "time",
when $0<time<T/2$, TIM$pb$=1 and
when $T/2<time<T$, TIM$pb$=0.

The position inferring value θh of the motor rotor is found and output by the following calculation of the time ratio of the respective voltage vectors as shown in the example of FIG. 6, with the following condition branching in accordance with the region of the PWM voltage space vectors (FIG. 4) where this is to be found.

When $0<\theta h<\pi/3$, [1]

when TIMpb=1, $V1: \frac{T}{2} \cdot k \cdot \{1 - \sqrt{3} \cdot \tan(\frac{\pi}{6} - \theta_h)\}$ $V2: \frac{T}{2} \cdot k \cdot \{1 + \sqrt{3} \cdot \tan(\frac{\pi}{6} - \theta_h)\}$ $V0: \frac{T}{2} \cdot (1 - k)$ When TIMpb=0, $V4: \frac{T}{2} \cdot k \cdot \{1 - \sqrt{3} \cdot \tan(\frac{\pi}{6} - \theta_h)\}$ $V5: \frac{T}{2} \cdot k \cdot \{1 + \sqrt{3} \cdot \tan(\frac{\pi}{6} - \theta_h)\}$ $V7: \frac{T}{2} \cdot (1 - k)$ (k is a constant satisfying 0<k<1)
These voltage vectors are successively output in the following sequence.

V1→V2→V0→V4→V5→V7.

When $\pi/3<\theta h<2\pi/3$, when TIMpb=1, $V2: \frac{T}{2} \cdot k \cdot \{1 - \sqrt{3} \cdot \tan(\frac{\pi}{6} - (\theta_h - \frac{\pi}{3}))\}$ $V3: \frac{T}{2} \cdot k \cdot \{1 + \sqrt{3} \cdot \tan(\frac{\pi}{6} - (\theta_h - \frac{\pi}{3}))\}$ $V0: \frac{T}{2} \cdot (1 - k)$ When TIMpb=0

$V5: \frac{T}{2} \cdot k \cdot \{1 - \sqrt{3} \cdot \tan(\frac{\pi}{6} - (\theta_h - \frac{\pi}{3}))\}$ $V6: \frac{T}{2} \cdot k \cdot \{1 + \sqrt{3} \cdot \tan(\frac{\pi}{6} - (\theta_h - \frac{\pi}{3}))\}$ $V7: \frac{T}{2} \cdot (1 - k)$ (k is a constant satisfying 0<k<1).
These voltage vectors are successively output in the following sequence.

V3→V2→V0→V6→V5→V7.

When $2\pi/3<\theta h<\pi$ [3]

when TIMpb=1, $V3: \frac{T}{2} \cdot k \cdot \{1 - \sqrt{3} \cdot \tan(\frac{\pi}{6} - (\theta_h - \frac{2\pi}{3}))\}$ $V4: \frac{T}{2} \cdot k \cdot \{1 + \sqrt{3} \cdot \tan(\frac{\pi}{6} - (\theta_h - \frac{2\pi}{3}))\}$ $V0: \frac{T}{2} \cdot (1 - k)$ when TIMpb=0, $$V6: \frac{T}{2} \cdot k \cdot \left\{1 - \sqrt{3} \cdot \tan\left(\frac{\pi}{6} - \left(\theta_h - \frac{2\pi}{3}\right)\right)\right\}$$

$$V1: \frac{T}{2} \cdot k \cdot \left\{1 + \sqrt{3} \cdot \tan\left(\frac{\pi}{6} - \left(\theta_h - \frac{2\pi}{3}\right)\right)\right\}$$

$$V7: \frac{T}{2} \cdot (1 - k)$$

(k is a constant satisfying 0<k<1)
These voltage vectors are successively output in the following sequence.
V3→V2→V0→V6→V5→V7.

When $2\pi/3 < \theta h < \pi$     [3]

when TIMpb=1, $$V3: \frac{T}{2} \cdot k \cdot \left\{1 - \sqrt{3} \cdot \tan\left(\frac{\pi}{6} - \left(\theta_h - \frac{2\pi}{3}\right)\right)\right\}$$

$$V4: \frac{T}{2} \cdot k \cdot \left\{1 + \sqrt{3} \cdot \tan\left(\frac{\pi}{6} - \left(\theta_h - \frac{2\pi}{3}\right)\right)\right\}$$

$$V0: \frac{T}{2} \cdot (1 - k)$$

when TIMpb=0, $$V6: \frac{T}{2} \cdot k \cdot \left\{1 - \sqrt{3} \cdot \tan\left(\frac{\pi}{6} - \left(\theta_h - \frac{2\pi}{3}\right)\right)\right\}$$

$$V1: \frac{T}{2} \cdot k \cdot \left\{1 + \sqrt{3} \cdot \tan\left(\frac{\pi}{6} - \left(\theta_h - \frac{2\pi}{3}\right)\right)\right\}$$

$$V7: \frac{T}{2} \cdot (1 - k)$$

(k is a constant satisfying 0<k<1)
These voltage vectors are successively output in the following sequence.
V3→V4→V0→V6→V1→V7.

When $\pi < \theta h < 4\pi/3$     [4]

when TIMpb=1, $$V4: \frac{T}{2} \cdot k \cdot \left\{1 - \sqrt{3} \cdot \tan\left(\frac{\pi}{6} - \left(\theta_h - \frac{3\pi}{3}\right)\right)\right\}$$

$$V5: \frac{T}{2} \cdot k \cdot \left\{1 + \sqrt{3} \cdot \tan\left(\frac{\pi}{6} - \left(\theta_h - \frac{3\pi}{3}\right)\right)\right\}$$

$$V0: \frac{T}{2} \cdot (1 - k)$$

when TIMpb=0, $$V1: \frac{T}{4} \cdot k \cdot \left\{1 - \sqrt{3} \cdot \tan\left(\frac{\pi}{6} - \left(\theta_h - \frac{3\pi}{3}\right)\right)\right\}$$

$$V2: \frac{T}{4} \cdot k \cdot \left\{1 + \sqrt{3} \cdot \tan\left(\frac{\pi}{6} - \left(\theta_h - \frac{3\pi}{3}\right)\right)\right\}$$

$$V7: \frac{T}{2} \cdot (1 - k)$$

(k is a constant, satisfying 0<k<1)
These voltage vectors are successively output in the following sequence.
V5→V4→V0→V2→V1→V7.

When $4\pi/3 < \theta h < 5\pi/3$     [5]

$$V5: \frac{T}{4} \cdot k \cdot \left\{1 - \sqrt{3} \cdot \tan\left(\frac{\pi}{6} - \left(\theta_h - \frac{4\pi}{3}\right)\right)\right\}$$

$$V6: \frac{T}{4} \cdot k \cdot \left\{1 + \sqrt{3} \cdot \tan\left(\frac{\pi}{6} - \left(\theta_h - \frac{4\pi}{3}\right)\right)\right\}$$

$$V0: \frac{T}{2} \cdot (1 - k)$$

when TIMpb=0, $$V2: \frac{T}{4} \cdot k \cdot \left\{1 - \sqrt{3} \cdot \tan\left(\frac{\pi}{6} - \left(\theta_h - \frac{4\pi}{3}\right)\right)\right\}$$

$$V3: \frac{T}{4} \cdot k \cdot \left\{1 + \sqrt{3} \cdot \tan\left(\frac{\pi}{6} - \left(\theta_h - \frac{4\pi}{3}\right)\right)\right\}$$

$$V7: \frac{T}{2} \cdot (1 - k)$$

(k is a constant satisfying 0<k<1)
These voltage vectors are successively output in the following sequence.
V5→V6→V0→V2→V3→V7.

When $5\pi/3 < \theta h < 2\pi$     [6]

when TIMpb=1, $$V6: \frac{T}{4} \cdot k \cdot \left\{1 - \sqrt{3} \cdot \tan\left(\frac{\pi}{6} - \left(\theta_h - \frac{5\pi}{3}\right)\right)\right\}$$

$$V1: \frac{T}{4} \cdot k \cdot \left\{1 + \sqrt{3} \cdot \tan\left(\frac{\pi}{6} - \left(\theta_h - \frac{5\pi}{3}\right)\right)\right\}$$

$$V0: \frac{T}{2} \cdot (1 - k)$$

when TIMpb=0, $$V3: \frac{T}{4} \cdot k \cdot \left\{1 - \sqrt{3} \cdot \tan\left(\frac{\pi}{6} - \left(\theta_h - \frac{5\pi}{3}\right)\right)\right\}$$

$$V4: \frac{T}{4} \cdot k \cdot \left\{1 + \sqrt{3} \cdot \tan\left(\frac{\pi}{6} - \left(\theta_h - \frac{5\pi}{3}\right)\right)\right\}$$

$$V7: \frac{T}{2} \cdot (1 - k)$$

(k is a constant satisfying 0<k<1)
These voltage vectors are successively output in the following sequence.
V1→V6→V0→V4→V3→V7.

Figure 5:
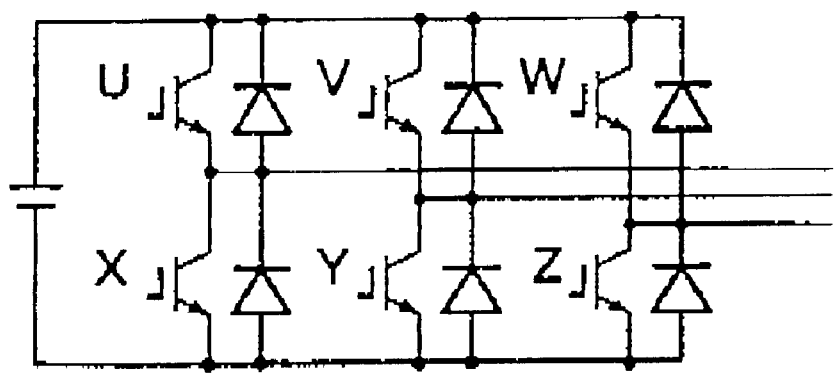
FIG. 5 is a view given in explanation of a three-phase PWM inverter in a motor control device according to this first embodiment.

Current co-ordinate conversion means (unit) 12 inputs the two phase current detection values Iu, Iw of the three phases and inferred rotor position detection value θh that is output from motor rotor position inferring means (unit) 14, and finds by the following calculation and outputs the d and q axis currents Id, Iq.

$$Id = \sqrt{\frac{3}{2}} \cdot \left\{\frac{2}{\sqrt{3}}\left(Iu \cdot \sin\left(\theta h + \frac{2}{3}\pi\right) - Iw \cdot \sin\theta h\right)\right\}$$

$$Id = \sqrt{\frac{3}{2}} \cdot \left\{\frac{2}{\sqrt{3}}\left(Iu \cdot \cos\left(\theta h + \frac{2}{3}\pi\right) - Iw \cdot \cos\theta h\right)\right\}$$

d and q axis rate of current change calculation means (unit) 13 inputs the d and q axis currents Id, Iq that are output from current co-ordinate conversion means (unit) 12 and the PWM synchronization pulse TIMpb that is output from PWM pattern generating means (unit) 11 and finds and outputs the current rates of change dId and dIq obtained by calculation as follows, as shown in FIG. 5.

(1) When TIMpb changes from 1 to 0, $$dId=(Id2-Id1)/(T/2)$$

$$dIq=(Iq2-Iq1)/(T/2)$$

where Id2 and Iq2 are the d and q axis currents detected when TIMpb changes from 1 to 0 and Id1 and Iq1 are the d and q axis currents detected when TIMpb changes from 0 to 1.

(2) When TIMpb changes from 0 to 1, $$dId=(Id3-Id2)/(T/2)$$

$$dIq=(Iq3-Iq2)/(T/2)$$

where Id3 and Iq3 are the d and q axis currents detected when TIMpb changes from 0 to 1 and Id2 and Iq2 are the d and q axis currents detected when TIMpb changes from 1 to 0.

Figure 7:
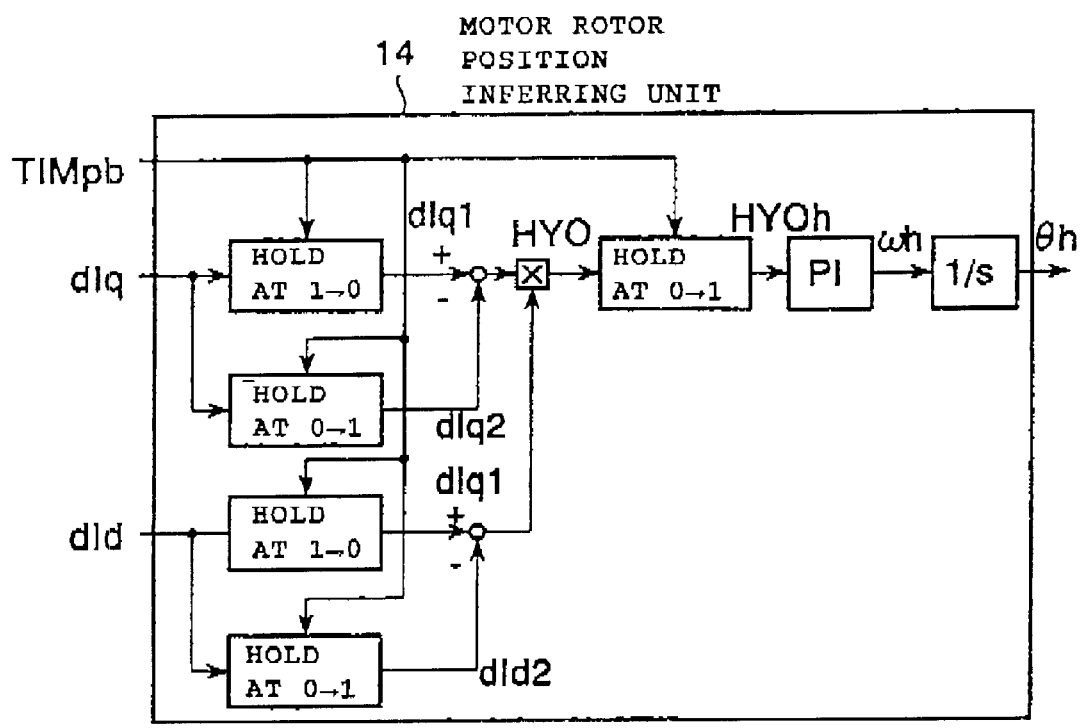
FIG. 7 is a functional block diagram illustrating an example layout of motor rotor position inferring means (unit) in a motor control device according to this first embodiment.

Motor rotor position inferring means (unit) 14 inputs the d and q rates of change dId and dIq that are output from d and q axis rate of current change calculating means (unit) 13 and the PWM synchronization pulse TIMpb that is output from PWM pattern generating means (unit) 11 and finds and outputs inferred position value θh of the motor rotor by calculation as follows as shown in FIG. 7.

When the PWM synchronization pulse TIMpb changes from 1 to 0, the d and q axis current rates of change dId and dIq are respectively stored and held as dId1 and dIq1.

$$dId1=dId$$

$$dIq1=dIq$$

When the PWM synchronization pulse TIMpb changes from 0 to 1, the d and q axis current rates of change dId and dIq are respectively stored and held as dId2 and dIq2

$$dId2=dId$$

$$dIq2=dIq$$

Furthermore, with this timing, evaluation variable HYOh is found by the following calculation and stored and held as HYOh.

$$HYOh=(dId1-dId2)\times(dIq1-dIq2)$$

Then, the inferred value of the angular frequency ωh of the motor rotor is found by proportional integral control such that this evaluation variable HYOh becomes zero.

$$\omega h=(KpSL+KiSL/s)*HYOh$$

(KPSL: proportional gain, KiSL: integral gain, s: Laplace operator)

The integrated value of this inferred value of the angular frequency ωh is output as the inferred position value θh of the motor rotor.

$$\theta h=1/s*\omega h$$

(s: Laplace operator)

In this way, the inferred value of the magnetic pole position can be obtained with high precision by a straightforward construction.

As described above, with a motor control device according to the present embodiment, a pulse synchronized with the PWM pattern is applied and it is arranged for the rate of current change of the d axis current and q axis to be detected synchronously with the PWM pattern, so error in inferring the motor rotor position caused by current harmonics in PWM switching can be reduced.

In this way, the position of the motor rotor can be ascertained with high precision by a straightforward device construction without employing a rotor position sensor; reduction in size, reduction in costs and increased ease of maintenance can thereby be achieved.

Second Embodiment

Figure 8:
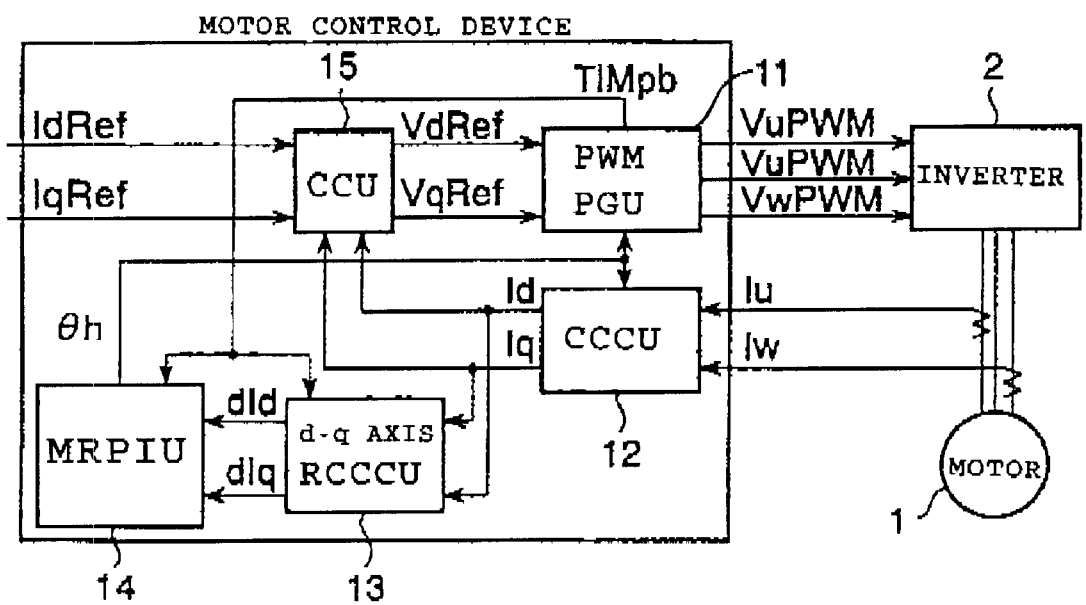
FIG. 8 is a functional block diagram illustrating a second embodiment of a motor control device according to the present invention.

FIG. 8 is a functional block diagram wherein a motor rotor according to the present embodiment has protruding magnetic polarity and illustrating an example layout of a motor control device whereby output from an inverter that converts DC power into AC power is supplied. Elements which are the same as in the case of FIG. 3 are given the same reference symbols and further description thereof is omitted, only parts that are different being described.

Specifically, as shown in FIG. 8, in the motor control device of the present embodiment current control means (unit) 15 is added to FIG. 3 described above and furthermore, in this construction, the function of PWM pattern generating means (unit) 11 and motor rotor position inferring means (unit) 14 is partially altered.

Current control means (unit) 15 manipulates the d axis voltage instruction and q axis voltage instruction of the output of inverter 2 such that the actual values of the d axis current and q axis current of motor 1 referred to above track the current instruction values.

PWM pattern generating means (unit) 11 uses the d axis voltage instruction and q axis voltage instruction which are output from current control means (unit) 15 and the inferred position value of the motor rotor to calculate and output a PWM pattern such that a d axis positive/negative pulse of the same period as the pulse width modulation (PWM) period of inverter 2 in the inferred d axis direction found from the inferred position value of this motor rotor is superimposed on the d axis voltage instruction and q axis voltage instruction.

Motor rotor inferring means (unit) 14 uses the PWM pattern output from PWM pattern generating means (unit) 11, the d axis rate of current change and the q axis rate of current change that are output from the d and q axis rate of current change calculating means (unit) 13 to calculate and infer the position of the motor rotor and output this as the inferred position value of this motor rotor.

Figure 9:
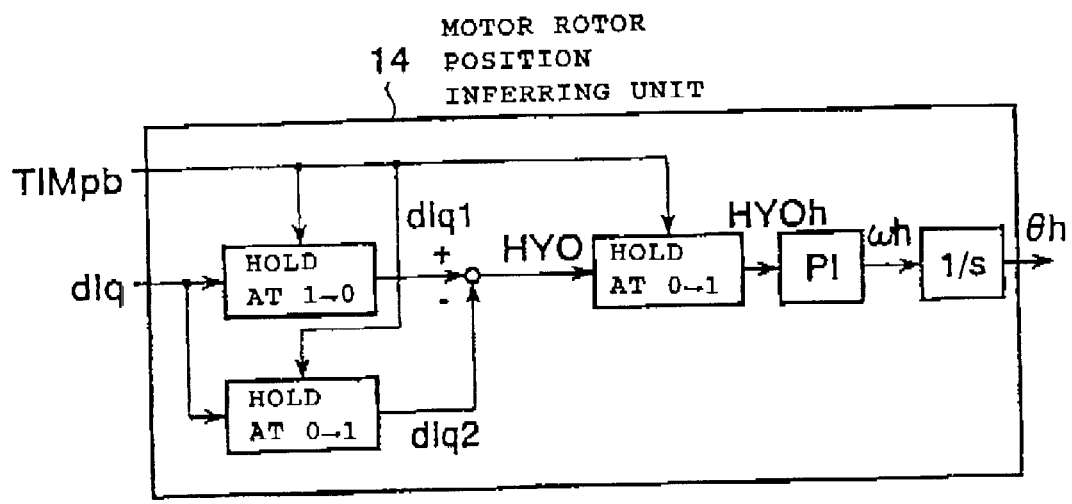
FIG. 9 is a functional block diagram illustrating an example layout of motor rotor position inferring means (unit) in a motor control device according to this second embodiment.

In the present embodiment, as shown by the functional block diagram in FIG. 9, motor rotor position inferring means (unit) 14 comprises evaluation variable calculating means (unit) that inputs the q axis rate of current change which is output from the d and q axis rate of current change calculating means (unit) 13 and calculates the difference of the q axis rate of current change at positive and negative time points of the d axis positive/negative pulse that is superimposed in PWM pattern generating means (unit) 11 and outputs this as an evaluation variable, and rotor position inferring means (unit) that performs a correction calculation on the position of the motor rotor such that the evaluation variable which is the output from this evaluation variable calculation means (unit) becomes zero.

Next, the action of the motor control device according to the present embodiment constructed as above will be described.

The action (operation) of co-ordinate conversion means (unit) 12 and d and q axis rate of current change calculating means (unit) 13 is the same as in the case of the first embodiment described above, so further description thereof is omitted and only the action of parts that are different will be described herein.

In FIG. 8, current control means (unit) 15 inputs the d and q axis current instructions IdRef and IqRef and the d and q axis currents Id, Iq that are output from current co-ordinate conversion means (unit) 12 and finds and outputs the d and q axis voltage references VdRef and VqRef by performing the following calculation.

$$VdRef=(Kp+Ki/s)*(IdRef-Id)$$

$$VqRef=(Kp+Ki/s)*(IqRef-Id)$$

(Kp: proportional gain, Ki: integral gain, s: Laplace operator)

PWM pattern generating means (unit) 11 inputs the d and q axis voltage references VdRef, VqRef that are output from current control means (unit) 15 and the motor rotor inferred position value θh that is output from motor rotor position inferring means (unit) 14 and finds and outputs the UVW three-phase PWM pattern by the following calculation.

During the PWM period T, the PWM synchronization pulse TIMpb that is changed over between 1 and 0 with time ratio 1:1 is defined by the following equation, as shown in FIG. 6.

Regarding the time "time", when 0<time<T/2, TIMpb=1 and when T/2<time<T, TIMpb=0.

Depending on the value of this PWM synchronization pulse TIMpb, the new d axis voltage instruction Vd is found by performing the following correction on the d axis voltage instruction VdRef.

when TIMpb=1, Vd=VdRef+Vk when TIMpb=0 Vd=VdRef−Vk (where Vk is a positive constant)
Vq=VqRef As the methods of finding the three-phase PWM pattern from these new voltage instructions Vd and vq, the methods that have previously been generally employed may be used, such as spatial vector modulation or triangular wave comparison modulation etc. The triangular wave comparison modulation method will now be described by way of example.

Specifically, the three-phase voltage instructions Vu, Vv and Vw are found by the following calculation from the d and q axis voltage instructions Vd and Vq.

$$V1=\sqrt{(Vd2+Vq)}$$

$$\delta V=\tan^{-1}(Vq/Vd)$$

$$Vu=\sqrt{(2/3)}\cdot V1\cdot\cos(\theta+\delta V)$$

$$Vv=\sqrt{(2/3)}\cdot V1\cdot\cos(\theta+\delta V-2\pi/3)$$

$$Vv=\sqrt{(2/3)}\cdot V1\cdot\cos(\theta+\delta V-4\pi/3)$$

The triangular wave TRI for triangular wave comparison is found by the following calculation.

The time when TIMpb changes from 0 to 1 is defined as t=0.

$$0<t<T/2, \text{ then } TRI=2Vdc\cdot(T/4-t) \quad (1)$$

$$T/2<t<T, \text{ then } TRI=2Vdc\cdot(t-3T/4) \quad (2)$$

The three-phase PWM patterns VuPWM, VvPWM and VwPWM are found and output by the following magnitude comparison.

When Vu>TRI, VuPWM=1, otherwise VuPWM=0

When Vv>TRI, VvPWM=1, otherwise VvWM=0

When Vw>TRI, VwPWM=1, otherwise VwPWM=0

Motor rotor position inferring means (unit) 14 inputs the q axis rate of current change dIq that is output from d and q axis rate of current change calculating means (unit) 13 and the PWM synchronization pulse TIMpb that is output from PWM pattern generating means (unit) 11 and finds and outputs the inferred position value θh of the motor rotor by the following calculation.

When the PWM synchronization pulse TIMpb changes from 1 to 0, the q axis rate of current change dIq is stored and held as dIq1.

$$dIq1=dIq$$

When the PWM synchronization pulse TIMpb changes from 0 to 1, the q axis rate of current change dIq is stored and held as dIq2.

$$dIq2=dIq$$

Furthermore, with this timing, the evaluation variable HYO is found by the following calculation and stored and held as HYOh.

$$HYOh=(dIq1-dIq2)$$

The inferred angular frequency value ωh of the motor rotor is then found by proportional integral control such that this evaluation variable HYOh becomes zero.

$$\omega h=(KpSL+KiSL/s)*HYOh$$

(KpSL: proportional gain, KiSL: integral gain, s: Laplace operator)

The integrated value of this inferred value of the angular frequency ωh of the motor rotor is output as the inferred position value θh of the motor rotor.

$$\theta h=1/s*\omega h$$

(s: Laplace operator)

In this way, the inferred value of the magnetic pole position can be obtained with high precision by a straightforward construction.

As described above, with a motor control device according to the present embodiment, the position of the motor rotor can be inferred without using a rotation sensor while controlling the current for achieving the desired value of the output torque of motor 1 in accordance with an instruction value.

Third Embodiment

Figure 10:
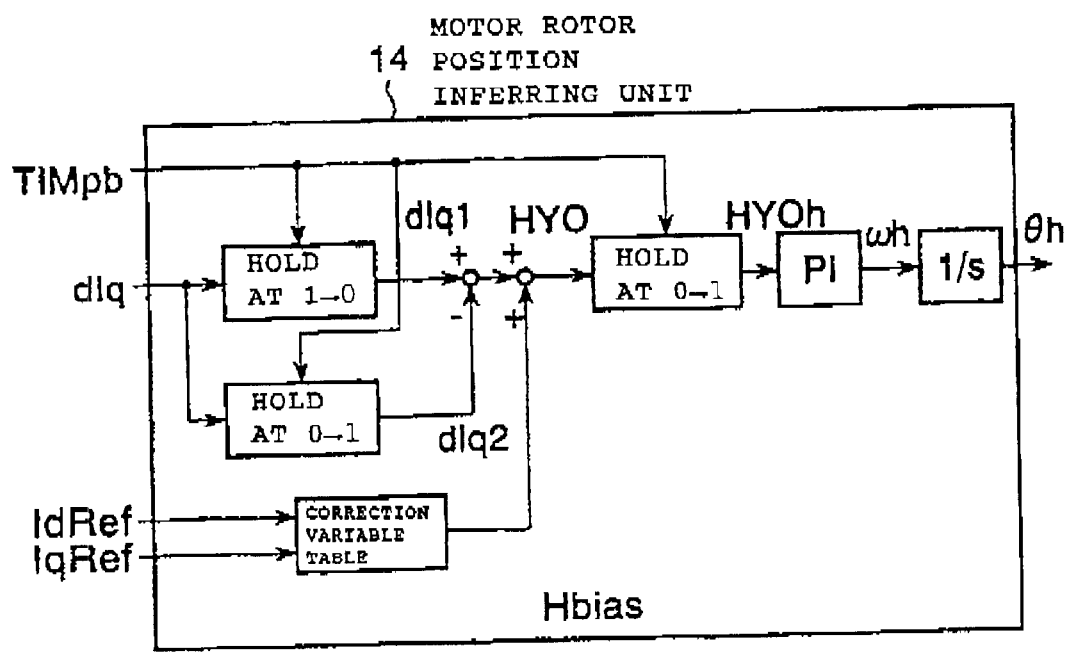
FIG. 10 is a functional block diagram illustrating a third embodiment of a motor control device according to the present invention.

FIG. 10 is a functional block diagram of an example layout of a motor rotor position inferring means (unit) 14 in a motor control device according to the present embodiment. Elements that are the same as in the case of FIG. 9 are given the same reference symbols and further description thereof is omitted, only parts that are different being here described.

Specifically, in the present embodiment, when the motor control device of the second embodiment described above is applied to a permanent magnet type reluctance motor, as shown in FIG. 10, the evaluation variable calculated by the evaluation variable calculation means (unit), which is a structural element of motor rotor position inferring means (unit) 14, is made to be a value obtained by adding a value stored beforehand taking into account the rotor magnetic saturation characteristic of the permanent magnet type reluctance motor, in accordance with the current instruction value referred to above, to the difference of the q axis current rates of change at positive and negative time points, of the d axis positive/negative pulse that is superimposed by PWM pattern generating means (unit) 11 described above, and this value is then arranged to be output.

Next, the action of a motor control device according to the present embodiment constituted as above will be described.

The action of PWM pattern generating means (unit) 11, co-ordinate conversion means (unit) 12, d and q axis rate of current change calculating means (unit) 13 and current control means (unit) 15 is the same as in the case of the second embodiment described above, so further description thereof is omitted and only the action of parts that are different will be described herein.

In FIG. 10, motor rotor position inferring means (unit) 14 inputs the q axis rate of current change dIq that is output from the d and q axis rate of current change calculating means (unit) 13, the PWM synchronization pulse TIMpb that is output from PWM pattern generating means (unit) 11 and the d and q axis current instructions IdRef and IqRef and finds and outputs the inferred position value θh of the motor rotor by the following calculation.

When the PWM synchronization pulse TIMpb changes from 1 to 0, the q axis rate of current change dIq is stored and held as dIq1.

$$dIq1 = dIq$$

When the PWM synchronization pulse TIMpb changes from 0 to 1, the q axis rate of current change dIq is stored and held as dIq2.

$$dIq2 = dIq$$

The evaluation variable bias value Hbias is found by the following formula that is preset taking into account the rotor magnetization saturation characteristic of the permanent magnet type reluctance motor which is to be controlled, from the d and q axis current instructions IdRef and IqRef.

$$Hbias = G(IdRef, IqRef)$$

(where G is a function of IdRef and IqRef).

In addition, with this timing, the evaluation variable HYO is found by the following calculation and stored and held as HYOh.

$$HYOh = (dIq1 - dIq2) + Hbias$$

The inferred angular frequency value ωh of the motor rotor is then found by proportional integral control such that this evaluation variable HYOh becomes zero.

$$\omega h = (KpSL + KiSL/s) * HYOh$$

(KPSL: proportional gain, KiSL: integral gain, s: Laplace operator)

The integrated value of this inferred value of the angular frequency ωh of the motor rotor is output as the inferred position value θh of the motor rotor.

$$\theta h = 1/s * \omega h$$

(s: Laplace Operator)

Figures 11A, 11B:
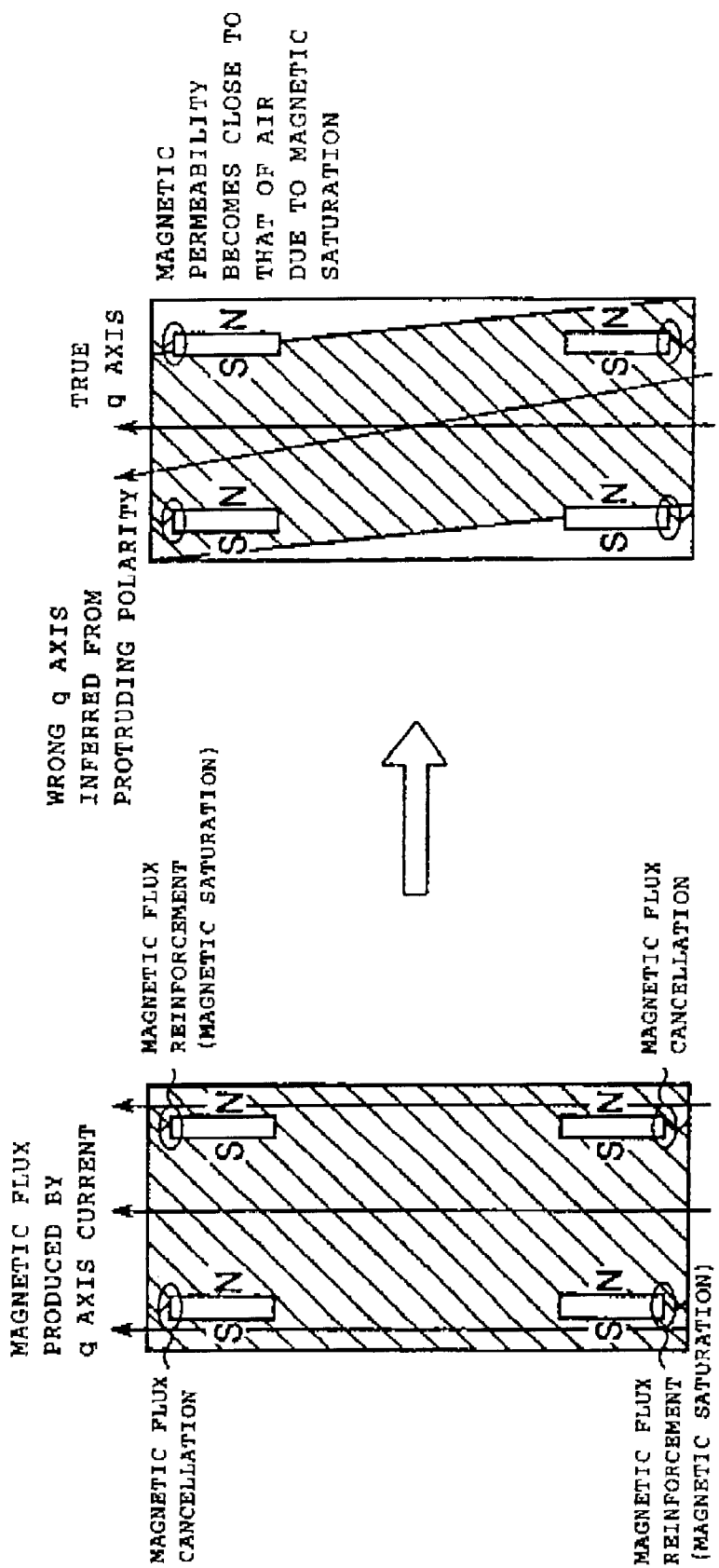
FIGS. 11A and 11B are a diagram illustrating a motor rotor given in explanation of the need for a correction table in a motor rotor position inferring means (unit) in a motor control device according to this third embodiment.

FIG. 11A and FIG. 11B are diagrams illustrating the motor rotor, given in explanation of the need for a correction table in the motor rotor position inferring means (unit) 14 in the present embodiment.

As described above, with a motor control device according to the present embodiment, when a permanent magnet type reluctance motor is controlled without using a rotation sensor, it is possible to perform inference of the position of the motor rotor with little error, by correcting for the increase in error of inference of the motor rotor position caused by apparent offset of the protruding magnetic polarity of the rotor due to partial magnetic saturation of the rotor caused by the current flowing through motor 1 for outputting torque.

Fourth Embodiment

Figure 12:
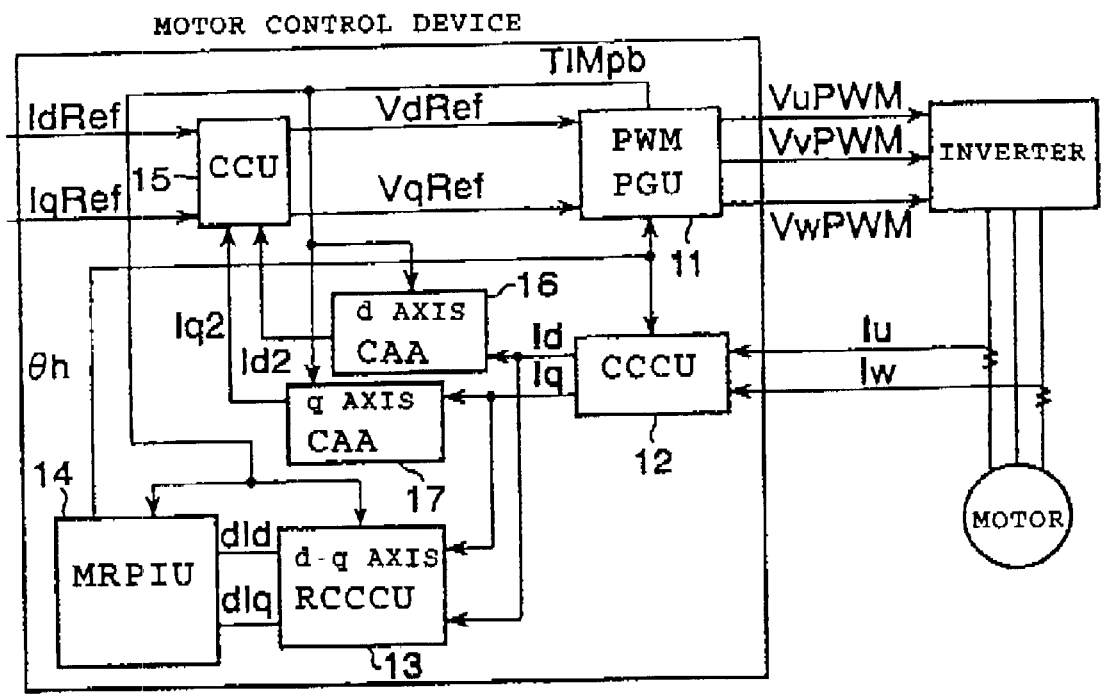
FIG. 12 is a functional block diagram illustrating a fourth embodiment of a motor control device according to the present invention.

FIG. 12 is a functional block diagram illustrating an example layout of a motor control device according to the present embodiment whereby the output from an inverter that converts DC power to AC power is supplied, the motor rotor having protruding magnetic polarity. Elements which are the same in FIG. 8 are given the same reference symbols and further description thereof is omitted, only parts which are different being described herein.

Specifically, as shown in FIG. 12, in a motor control device according to the present embodiment there are added to FIG. 8 described above a d axis current addition and averaging means (unit) 16 and a q axis current addition and averaging means (unit) 17.

d axis current addition and averaging means (unit) 16 inputs the actual value of the d axis current which is output from current co-ordinate conversion means (unit) 12 described above and calculates and outputs the average value over the PWM period based on the PWM pattern which is output from PWM pattern generating means (unit) 11 described above.

q axis current addition and averaging means (unit) 17 inputs the actual value of the q axis current which is output from current co-ordinate conversion means (unit) 12 described above and calculates and outputs the average value over the PWM period based on the PWM pattern which is output from PWM pattern generating means (unit) 11 described above.

The outputs from this d axis current addition and averaging means (unit) 16 and q axis current addition and averaging means (unit) 17 are arranged to be respectively input to current control means (unit) 15.

Next, the action of a motor control device according to the embodiment of the invention constructed as above will be described.

The action of PWM pattern generating means (unit) 11, current co-ordinate conversion means (unit) 12, d and q axis rate of current change calculating means (unit) 13, motor rotor position inferring means (unit) 14 and current control means (unit) 15 are the same as in the case of the second embodiment, so further description thereof is omitted and only the action of parts which are different will be described.

In FIG. 12, d axis current addition and averaging means (unit) 16 inputs the d axis current Id that is output from current co-ordinate conversion means (unit) 12 and the PWM synchronization pulse TIMpb that is output from PWM pattern generating means (unit) 11 and finds and outputs the d axis current average value Id2 by performing the following calculation.

$$I_{d2} = \int I_d \, dt$$

Where TIMpb is the rise time from 0 to 1 and Id2=0 (the above integral is cleared to 0)

q axis current addition and averaging means (unit) 17 inputs the q axis current Iq that is output from current co-ordinate conversion means (unit) 12 and the PWM synchronization pulse TIMpb that is output from PWM pattern generating means (unit) 11 and finds and outputs the q axis current average value Iq2 by performing the following calculation.

$$I_{q2} = \int I_q dt$$

Where TIMpb is the rise time from 0 to 1 and Iq2=0 (the above integral is cleared to 0).

In this way, it can be ensured that the motor rotor position inference calculation and the current control calculation have no effect on each other and the precision of motor rotor position inference can thus be improved and the precision of current control also improved.

As described above, with a motor control device according to the present embodiment, position inference calculation of the motor rotor and current control calculation can be performed in such a way that they do not have an adverse effect on each other and the precision of position inference of the motor rotor can be improved and the precision of current control also improved.

Fifth Embodiment

Figure 13:
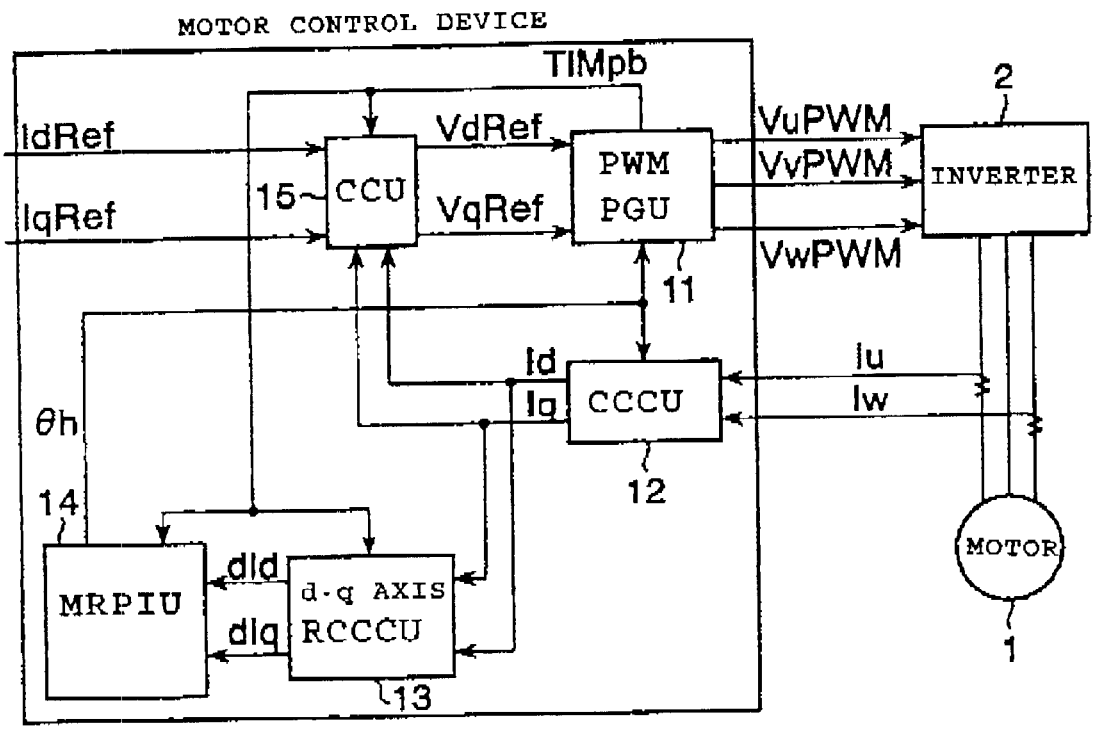
FIG. 13 is a functional block diagram illustrating a fifth embodiment of a motor control device according to the present invention.

FIG. 13 is a functional block diagram illustrating an example layout of a motor control device according to the present embodiment whereby the output from an inverter that converts DC power to AC power is supplied, the motor rotor having protruding magnetic polarity. Elements which are the same in FIG. 8 are given the same reference symbols and further description thereof is omitted, only parts which are different being described herein.

Specifically, as shown in FIG. 13, in a motor control device according to the present embodiment, the current control means (unit) 15 in FIG. 8 described above is arranged to operate only at each separation time in synchronization with the PWM period, based on the PWM pattern which is output from PWM pattern generating means (unit) 11 described above.

Next, the operation of a motor control device according to the present embodiment constructed as above will be described.

The action of PWM pattern generating means (unit) 11, current co-ordinate conversion means (unit) 12, d and q axis rate of current change calculating means (unit) 13 and motor rotor position inferring means (unit) 14 is the same as in the case of the second embodiment described above so further description thereof is omitted, only the action of parts that are different being here described.

In FIG. 13, current control means (unit) 15 inputs d and q current instructions IdRef, IqRef, d and q axis currents Id and Iq that are output from current co-ordinate conversion means (unit) 12, and PWM synchronization pulse TIMpb that is output from PWM pattern generating means (unit) 11 and finds and outputs the d and q axis voltage instructions VdRef, VqRef by the following calculation.

When TIMpb changes from 0 to 1, $SKBN\_Vd=SKBN\_Vd+(IdREF-Id)\times Ki\times T$ $SKBN\_Vq=SKBN\_Vq+(IqREF-Iq)\times Ki\times T$ $VdRef=Kp\times(IdRef-Id)+SKBN\_Vd$ $VqRef=Kp\times(IqRef-Iq)+SKBN\_Vd$ (Kp: proportional gain, Ki: integral gain, T: PWM period)

In a condition where TIMpb is otherwise than as above, $VdRef=VdRef$ $VqRef=VqRef$ $SKBN\_Vd=SKBN\_Vd$ $SKBN\_Vq=SKBN\_Vq$ (Variable Holding)

In this way, it can be ensured that the motor rotor position inference calculation and the current control calculation have no effect on each other and the precision of motor rotor position inference can thus be improved and the precision of current control also improved.

As described above, with a motor control device according to the present embodiment, position inference calculation of the motor rotor and current control calculation can be performed in such a way that they do not have an adverse effect on each other and the precision of position inference of the motor rotor can be improved and the precision of current control also improved.

Sixth Embodiment

Figure 14:
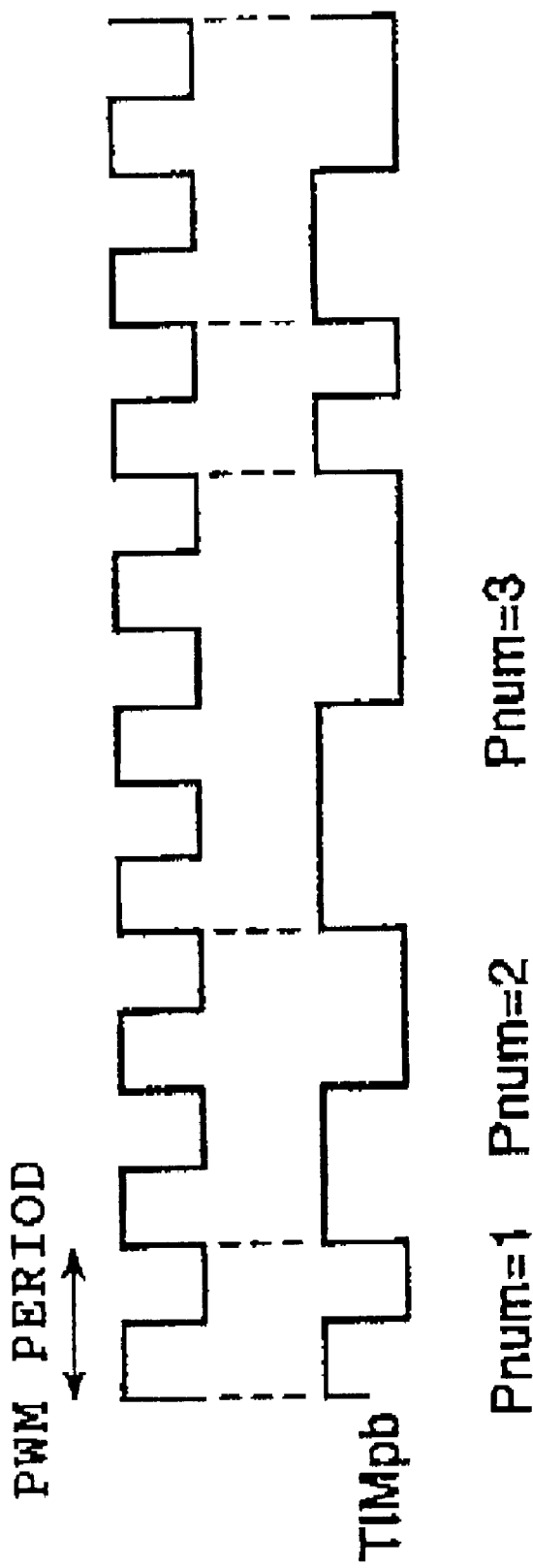
FIG. 14 is a view showing a timing chart of the PWM synchronization pulse in PWM pattern generating means (unit) of a motor control device according to a sixth embodiment of the present invention.

In a motor control device according to the present embodiment, a construction is adopted wherein to the motor control device of the first embodiment described above means are added whereby the pulse width in the PWM pulse generating means (unit) 11 described above is set to an integral multiple of the PWM period T of the inverter 2 described above and the set value of this multiplication factor is made variable with time, as shown by the timing chart of FIG. 14.

Next, the action of a motor control device according to the present embodiment constructed as above will be described.

The action of current co-ordinate conversion means (unit) 12, d and q axis rate of current change calculating means (unit) 13 and motor rotor position inferring means (unit) 14 is the same as in the case of the first embodiment described above, so further description thereof is omitted and only the action of parts that are different is described herein.

In FIG. 14, PWM pattern generating means (unit) 11 inputs the inferred position value θh of the motor rotor that is output from motor rotor position inferring means (unit) 14 and outputs a PWM pattern obtained by the following calculation.

FIG. 4 is a view illustrating the voltage space vectors in PWM pattern generating means (unit) 11.

In FIG. 4, V0 to V7 respectively represent the switching conditions of the switching elements of three-phase inverter 2 shown in FIG. 5 and are defined as follows.

V0: U ON, V ON, W ON, X OFF, Y OFF, Z OFF
V1: U ON, V OFF, W OFF, X OFF, Y ON, Z ON
V2: U ON, V ON, W OFF, X OFF, Y OFF, Z ON
V3: U OFF, V ON, W OFF, X ON, Y OFF, Z ON
V4: U OFF, V ON, W ON, X ON, Y OFF, Z OFF
V5: U OFF, V OFF, W ON, X ON, Y ON, Z OFF
V6: U ON, V OFF, W ON, X OFF, Y ON, Z OFF
V7: U OFF, V OFF, W OFF, X ON, Y ON, Z ON.

The pulse width multiplication factor set value Pnum is set as follows.

Pnum=Pnum+1
when Pnum>4, Pnum=0

By means of the above setting expression, the pulse width multiplication factor set value Pnum changes as shown in FIG. 13:

Pnum=1→2→3→1→2→3→1

The PWM synchronization pulse TIMpb that changes over from 1 to 0 with a time ratio of 1:1 in accordance with this pulse width set multiplication factor setting value Pnum is defined by the following expressions.

when $P$num=1, [1]

Regarding the time "time",
when 0<time<T/2, TIMpb=1 and
when T/2<time<T, TIMpb=0.

when $P$num=2, [2]

Regarding the time "time",
when 0<time<T, TIMpb=1 and
when T<time<2T, TIMpb=0.

when $P$num=3, [3]

Regarding the time "time",
when 0<time<1.5T, TIMpb=1 and
when 1.5T<time<3T, TIMpb=0.

The inferred position value θh of the motor rotor is found and output by the following calculation of the time ratio of the respective voltage vectors as shown in the example of FIG. 6, with the following condition branching in accordance with the region of the PWM voltage space vectors (FIG. 4) where this is to be found.

When $0<\theta h<\pi/3$, [1]

when TIMpb=1, $$V1: \frac{T}{2} \cdot k \cdot \{1 - \sqrt{3} \cdot \tan(\frac{\pi}{6} - \theta_h)\}$$

$$V2: \frac{T}{2} \cdot k \cdot \{1 + \sqrt{3} \cdot \tan(\frac{\pi}{6} - \theta_h)\}$$

$$V0: \frac{T}{2} \cdot (1 - k)$$

When TIMpb=0, $$V4: \frac{T}{2} \cdot k \cdot \{1 - \sqrt{3} \cdot \tan(\frac{\pi}{6} - \theta_h)\}$$

$$V5: \frac{T}{2} \cdot k \cdot \{1 + \sqrt{3} \cdot \tan(\frac{\pi}{6} - \theta_h)\}$$

$$V7: \frac{T}{2} \cdot (1 - k)$$

(k is a constant satisfying 0<k<1)
These voltage vectors are successively output in the following sequence.
V1→V2→V0→V4→V5→V7.

When $\pi/3<\theta h<2\pi/3$, [2]

when TIMpb=1, $$V2: \frac{T}{2} \cdot k \cdot \{1 - \sqrt{3} \cdot \tan(\frac{\pi}{6} - (\theta_h - \frac{\pi}{3}))\}$$

$$V3: \frac{T}{2} \cdot k \cdot \{1 + \sqrt{3} \cdot \tan(\frac{\pi}{6} - (\theta_h - \frac{\pi}{3}))\}$$

$$V0: \frac{T}{2} \cdot (1 - k)$$

When TIMpb=0

$$V5: \frac{T}{2} \cdot k \cdot \{1 - \sqrt{3} \cdot \tan(\frac{\pi}{6} - (\theta_h - \frac{\pi}{3}))\}$$

$$V6: \frac{T}{2} \cdot k \cdot \{1 + \sqrt{3} \cdot \tan(\frac{\pi}{6} - (\theta_h - \frac{\pi}{3}))\}$$

$$V7: \frac{T}{2} \cdot (1 - k)$$

(k is a constant satisfying 0<k<1)
These voltage vectors are successively output in the following sequence.
V3→V2→V0→V6→V5→V7.

When $2\pi/3<\theta h<\pi$ [2]

when TIMpb=1, $$V3: \frac{T}{2} \cdot k \cdot \{1 - \sqrt{3} \cdot \tan(\frac{\pi}{6} - (\theta_h - \frac{2\pi}{3}))\}$$

$$V4: \frac{T}{2} \cdot k \cdot \{1 + \sqrt{3} \cdot \tan(\frac{\pi}{6} - (\theta_h - \frac{2\pi}{3}))\}$$

$$V0: \frac{T}{2} \cdot (1 - k)$$

when TIMpb=0, $$V6: \frac{T}{2} \cdot k \cdot \{1 - \sqrt{3} \cdot \tan(\frac{\pi}{6} - (\theta_h - \frac{2\pi}{3}))\}$$

$$V1: \frac{T}{2} \cdot k \cdot \{1 + \sqrt{3} \cdot \tan(\frac{\pi}{6} - (\theta_h - \frac{2\pi}{3}))\}$$

$$V7: \frac{T}{2} \cdot (1 - k)$$

(k is a constant satisfying 0<k<1)
These voltage vectors are successively output in the following sequence.
V3→V4→V0→V6→V1→V7.

When $\pi<\theta h<4\pi/3$ [4]

when TIMpb=1, $$V4: \frac{T}{2} \cdot k \cdot \{1 - \sqrt{3} \cdot \tan(\frac{\pi}{6} - (\theta_h - \frac{3\pi}{3}))\}$$

$$V5: \frac{T}{2} \cdot k \cdot \{1 + \sqrt{3} \cdot \tan(\frac{\pi}{6} - (\theta_h - \frac{3\pi}{3}))\}$$

$$V0: \frac{T}{2} \cdot (1 - k)$$

when TIMpb=0, $$V1: \frac{T}{4} \cdot k \cdot \{1 - \sqrt{3} \cdot \tan(\frac{\pi}{6} - (\theta_h - \frac{3\pi}{3}))\}$$

-continued $$V2: \frac{T}{4} \cdot k \cdot \left\{1 + \sqrt{3} \cdot \tan\left(\frac{\pi}{6} - \left(\theta_h - \frac{3\pi}{3}\right)\right)\right\}$$

$$V7: \frac{T}{2} \cdot (1-k)$$

(k is a constant satisfying 0<k<1).
These voltage vectors are successively output in the following sequence.
V5→V4→V0→V2→V1→V7.

When $4\pi/3<\theta h<5\pi/3$ [5]

when TIMpb=1, $$V5: \frac{T}{4} \cdot k \cdot \left\{1 - \sqrt{3} \cdot \tan\left(\frac{\pi}{6} - \left(\theta_h - \frac{4\pi}{3}\right)\right)\right\}$$

$$V6: \frac{T}{4} \cdot k \cdot \left\{1 + \sqrt{3} \cdot \tan\left(\frac{\pi}{6} - \left(\theta_h - \frac{4\pi}{3}\right)\right)\right\}$$

$$V0: \frac{T}{2} \cdot (1-k)$$

when TIMpb=0, $$V2: \frac{T}{4} \cdot k \cdot \left\{1 - \sqrt{3} \cdot \tan\left(\frac{\pi}{6} - \left(\theta_h - \frac{4\pi}{3}\right)\right)\right\}$$

$$V3: \frac{T}{4} \cdot k \cdot \left\{1 + \sqrt{3} \cdot \tan\left(\frac{\pi}{6} - \left(\theta_h - \frac{4\pi}{3}\right)\right)\right\}$$

$$V7: \frac{T}{2} \cdot (1-k)$$

(k is a constant satisfying 0<k<1)
These voltage vectors are successively output in the following sequence.
V5→V6→V0→V2→V3→V7.

When $5\pi/3<\theta h<2\pi$ [6]

When TIMpb=1

$$V6: \frac{T}{4} \cdot k \cdot \left\{1 - \sqrt{3} \cdot \tan\left(\frac{\pi}{6} - \left(\theta_h - \frac{5\pi}{3}\right)\right)\right\}$$

$$V1: \frac{T}{4} \cdot k \cdot \left\{1 + \sqrt{3} \cdot \tan\left(\frac{\pi}{6} - \left(\theta_h - \frac{5\pi}{3}\right)\right)\right\}$$

$$V0: \frac{T}{2} \cdot (1-k)$$

When TIMpb=0

$$V3: \frac{T}{4} \cdot k \cdot \left\{1 - \sqrt{3} \cdot \tan\left(\frac{\pi}{6} - \left(\theta_h - \frac{5\pi}{3}\right)\right)\right\}$$

$$V4: \frac{T}{4} \cdot k \cdot \left\{1 + \sqrt{3} \cdot \tan\left(\frac{\pi}{6} - \left(\theta_h - \frac{5\pi}{3}\right)\right)\right\}$$

$$V7: \frac{T}{2} \cdot (1-k)$$

(k is a constant satisfying 0<k<1)
These voltage vectors are successively output in the following sequence.
V1→V6→V0→V4→V3→V7.

In this way, the frequency spectrum of the electromagnetic noise of motor 1 generated due to the pulse voltage applied for inferring the position of the motor rotor is not fixed at a certain value but can be dispersed with regard to time, making it possible to lower the perceived noise.

As described above, with a motor control device according to the present embodiment, the frequency spectrum of the electromagnetic noise of motor 1 generated due to the pulse voltage applied for inferring the position of the motor rotor is not fixed at a certain value but can be dispersed with regard to time, making it possible to lower the perceived noise.

Seventh Embodiment

Figures 15A, 15B:
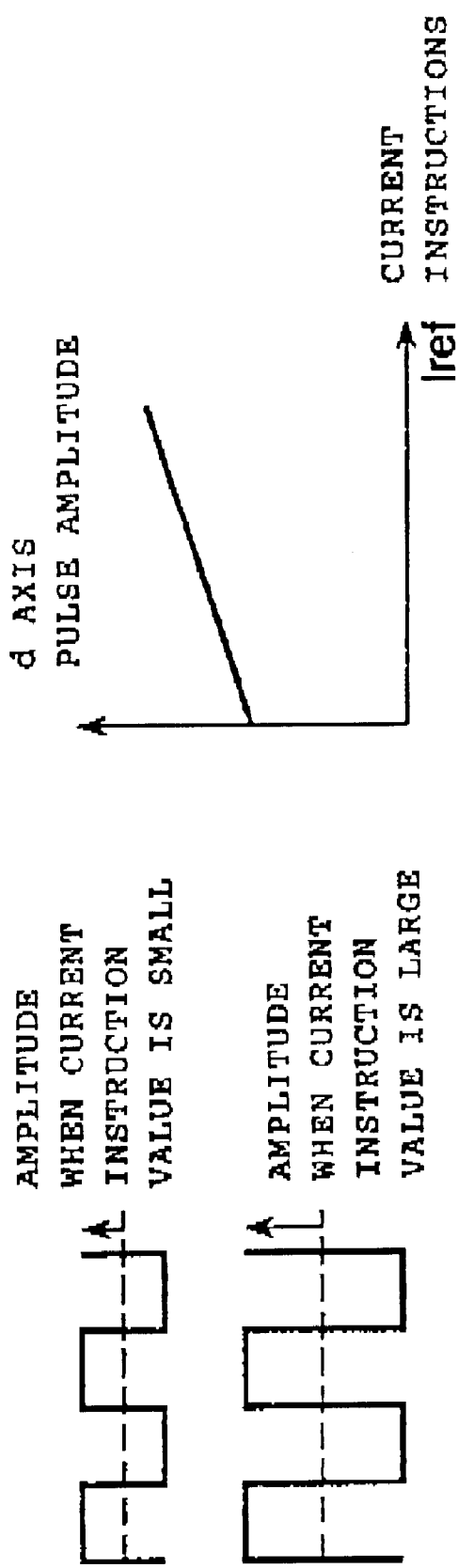
FIGS. 15A and 15B are a view given in explanation of the change of d axis pulse amplitude in the PWM pattern generating means (unit) in the motor control device of a seventh embodiment of the present invention.

In the present embodiment, when a motor control device according to the second embodiment is applied to a permanent magnet type reluctance motor, as shown in FIG. 15, a construction is adopted whereby the amplitude of the d axis positive/negative pulses superimposed by PWM pattern generating means (unit) 11 described above are variably set to a value stored beforehand taking into account the rotor magnetic saturation characteristic of the permanent magnet type reluctance motor, in accordance with the current instruction value.

Next, the action of a motor control device according to the present embodiment constructed as above will be described.

The action of current co-ordinate conversion means (unit) 12, d and q axis rate of current change calculating means (unit) 13, motor rotor position inferring means (unit) 14 and current control means (unit) 15 is the same as that described in the second embodiment, so further description thereof is omitted, only the action of parts that are different being described herein.

In FIG. 15, PWM pattern generating means (unit) 11 inputs the d and q axis voltage instructions VdRef, VqRef that are output from current control means (unit) 15, the motor rotor inferred position value θh that is output from motor rotor position inferring means (unit) 14 and the d and q axis current instructions IdRef and IqRef, and obtains and outputs a UVW three-phase PWM pattern by calculation as follows.

During the PWM period T, the PWM synchronization pulse TIMpb that is changed over between 1 and 0 with time ratio 1:1 is defined by the following expressions, as shown in FIG. 6.

Regarding the time "time",
when 0<time<T/2, TIMpb=1 and
when T/2<time<T, TIMpb=0.

Depending on the value of this PWM synchronization pulse TIMpb, the new d axis voltage instruction vd is found by performing the following correction on the d axis voltage instruction VdRef.

Also, the current instruction I1Ref is found by the following calculation.

$$I_1\text{Ref} = \sqrt{I_{d\text{Ref}}^2 + I_{q\text{Ref}}^2}$$

The d axis voltage pulse amplitude of Vk may be found by the following calculation in accordance with this current instruction I1Ref.

$$Vk = Vk0 + a \times I1\text{Ref}$$

(Vk0 and a are constants)
When TIMpb=1, Vd=VdRef+Vk
when TIMpb=0 Vd=VdRef−Vk
(where Vk is a positive constant)
Vq=VqRef As the methods of finding the three-phase PWM pattern from these new voltage instructions Vd and Vq, the methods that have previously been generally employed may be used, such as spatial vector modulation or triangular wave comparison modulation etc. The triangular wave comparison modulation method will now be described by way of example.

Specifically, the three-phase voltage instructions Vu, Vv and Vw are found by the following calculation from the d and q axis voltage instructions vd and Vq.

$$V1=\sqrt(Vd2+Vq)$$

$$\delta V=\tan^{-1}(Vq/Vd)$$

$$Vu=\sqrt(2/3)\cdot V1\cdot\cos(\theta+\delta V)$$

$$Vv=\sqrt(2/3)\cdot V1\cdot\cos(\theta+\delta V-2\pi/3)$$

$$Vv=\sqrt(2/3)\cdot V1\cdot\cos(\theta+\delta V-4\pi/3)$$

The triangular wave TRI for triangular wave comparison is found by the following calculation.

The time when TIMpb changes from 0 to 1 is defined as t=0.

$$0<t<T/2, \text{ then } TRI=2Vdc\cdot(T/4-t) \quad (1)$$

$$T/2<t<T, \text{ then } TRI=2Vdc\cdot(t-3T/4) \quad (2)$$

The three-phase PWM patterns VuPWM, VVPWM and VwPWM are found and output by the following magnitude comparison.

When Vu>TRI, VuPWM=1, otherwise VuPWM=0
When Vv>TRI, VvPWM=1, otherwise VvWM=0
When Vw>TRI, VwPWM=1, otherwise VwPWM=0

In this way, in the case of low current operation where the protruding polarity is large due to the magnetic saturation of the rotor core of motor 1 being small, copper loss and electromagnetic noise of the current flowing can be reduced by making the amplitude of the applied pulse small, whereas in the case of large current operation where the protruding polarity is small due to the magnetic saturation of the rotor core of motor 1 being large, reliable position inference of the motor rotor can be performed by making the amplitude of the applied pulse large.

As described above, with a motor control device according to the present embodiment, in the case of low current operation where the protruding polarity is large due to the magnetic saturation of the rotor core of a permanent magnet type reluctance motor being small, copper loss and electromagnetic noise of the current flowing can be reduced by making the amplitude of the applied pulse small, whereas in the case of large current operation where the protruding polarity is small due to the magnetic saturation of the rotor core of the permanent magnet type reluctance motor being large, reliable position inference of the motor rotor can be performed by making the amplitude of the applied pulse large.

Other Embodiments

It should be noted that the present invention is not restricted to the above embodiments but could be put into practice in various modified ways in the implementation stage without departing from its essence.

Also, the various embodiments could be put into practice in suitable combinations as feasible and in such cases combined beneficial effects can be obtained.

Furthermore, the above embodiments include inventions of various stages and various inventions can be extracted by suitable combination of the plurality of structural items disclosed.

For example, even if some structural items are deleted from the total of structural items illustrated in the embodiments, so long as (at least one) problem set forth in the "problem" section that is to be solved by the invention can be solved and (at least one) beneficial effect described in the "beneficial effect" section of the invention can be obtained, such a construction from which these structural items have been deleted may still be extracted as an invention.

As described above, with a motor control device according to the present invention, the position of the motor rotor can be ascertained with high precision by a straightforward device construction without employing a rotor position sensor and reduction in size, reduction in costs and facilitation of maintenance can be achieved.

Obviously, numerous additional modifications and variations of the present invention are possible in light of the above teachings. It is therefore to be understood that within the scope of the appended claims, the present invention may be practiced otherwise than as specially described herein.

What is claimed is:

1. A motor control device including
   a motor rotor having magnetically protruding polarity;
   an inverter that converts DC power to AC power; and
   a control unit that supplies an output from said inverter to said motor rotor, comprising:
      a PWM pattern generating unit that calculates and outputs a PWM pattern such as to output a pulse synchronized with a period of pulse width modulation (PWM) of said inverter and depending on an inferred position value of said motor rotor;
      a current co-ordinate conversion unit that, using said inferred position value of said motor rotor converts a three-phase current to actual values of a d axis current and q axis current, which are values on a d and q co-ordinate axes (q axis: direction of a protruding polarity of said motor rotor, d axis: direction at right angles to a direction of protruding polarity of said motor rotor);
      a d and q axis rate of current change calculating unit that respectively calculates and outputs rates of change with time of said d axis current and q axis current actual values, which are outputs from said current co-ordinate conversion unit, synchronized with a PWM pattern which is an output from said PWM pattern generating unit; and
      a motor rotor position inferring unit that infers and calculates a position of said motor rotor, using said PWM pattern which is output from said PWM pattern generating unit and said d axis rate of current change and q axis rate of current change which are output from said d and q axis rate of current change calculating unit and outputs a calculated value as an inferred position value of said motor rotor.

2. The motor control device according to claim 1, further comprising:
   a setting unit that sets a pulse width in said PWM pattern generating unit to an integral multiple of a pulse width (PWM) period and makes a set value of said integral multiple variable with time.

3. A motor control device including
   a motor rotor having magnetically protruding polarity;
   an inverter that converts DC power to AC power; and
   a control unit that supplies an output from said inverter to said motor rotor, comprising:
      a current control unit that manipulates a d axis voltage instruction and q axis voltage instruction of said inverter output such that an actual values of said d axis current and q axis current (q axis: direction of a protruding polarity of said motor rotor, d axis: direction at right angles to a direction of protruding polarity of said motor rotor) of said motor track a current instruction value;

a PWM pattern generating unit that calculates and outputs a PWM pattern such as to superimpose on said d axis voltage instruction and q axis voltage instruction a d axis positive/negative pulse of a same period as a period of pulse width modulation (PWM) of said inverter in an inferred d axis direction found from an inferred position value of said motor rotor, using said inferred position value of said motor rotor and the d axis voltage instruction and q axis voltage instruction which are output from said current control unit;

a current co-ordinate conversion unit that, using said inferred position value of said motor rotor converts a three-phase current of said motor to actual values of said d axis current and q axis current, which are values on d and q co-ordinate axes;

a d and q axis rate of current change calculating unit that respectively calculate and output rates of change with time of d axis current and q axis current actual values, which are outputs from said current co-ordinate conversion unit, synchronized with a PWM pattern which is an output from said PWM pattern generating unit; and a motor rotor position inferring unit that infers and calculates a position of said motor rotor, using a PWM pattern which is output from said PWM pattern generating unit and d axis rate of current change and q axis rate of current change which are output from said d and q axis rate of current change calculating unit and outputs a calculated value as an inferred position value of said motor rotor.

4. The motor control device according to claim 3, wherein said motor rotor position inferring unit comprises an evaluation variable calculating unit that inputs a rate of change of said q axis current which is output from said d and q axis rate of current change calculating unit and outputs difference of a rate of change of q axis current at positive and negative time-points of a d axis positive/negative pulse that is superimposed by said PWM pattern generating unit as an evaluation variable; and a motor rotor position inferring unit that performs a corrective calculation on said motor rotor position such that said evaluation variable which is output from said evaluation variable calculating unit is zero.

5. A motor control device according to claim 4, wherein, when said motor control device is applied to a permanent magnet type reluctance motor, said motor control device outputs, as a value obtained by adding a value that has been stored beforehand taking into account said permanent magnet type reluctance motor rotor magnetic saturation characteristic in accordance with said current instruction value to a difference of a rate of change of a q axis current at positive and negative time-points of said d axis positive/negative pulse superimposed by said PWM pattern generating unit, an evaluation variable calculated by said evaluation variable calculating unit, which is a constituent element of said motor rotor position inferring unit.

6. The motor control device according to claim 3, further comprising:

a d axis current addition and averaging unit that inputs actual values of a d axis current that are output from said current co-ordinate conversion unit and calculates and outputs average values during a PWM period based on a PWM pattern that is output from said PWM pattern generating unit; and a q axis current addition and averaging unit that inputs actual values of a q axis current that are output from said current co-ordinate conversion unit and calculates and outputs average values during a PWM period based on a PWM pattern that is output from said PWM pattern generating unit, wherein said d axis current and averaging unit and said q axis current addition and averaging unit respectively input outputs of said d axis current addition and averaging unit and said q axis current addition and averaging unit to said current control unit.

7. The motor control device according to claim 3, wherein said current control unit operates only during a time of separation in synchronization with a PWM period based on a PWM pattern that is output from said PWM pattern generating unit.

8. The motor control device according to claim 3, wherein, when said motor control device is applied to a permanent magnet type reluctance motor, said motor control device variably sets an amplitude of a d axis positive/negative pulse which is superimposed by said PWM pattern generating unit to a value that has been stored beforehand taking into account said permanent magnet type reluctance motor rotor magnetic saturation characteristic in accordance with said current instruction value.

* * * * *